US010348921B2

(12) United States Patent
Kozuka et al.

(10) Patent No.: US 10,348,921 B2
(45) Date of Patent: Jul. 9, 2019

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventors: Yasuhiro Kozuka, Tokyo (JP); Keishi Inaba, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 15/234,516

(22) Filed: Aug. 11, 2016

(65) Prior Publication Data
US 2017/0070630 A1   Mar. 9, 2017

(30) Foreign Application Priority Data

Sep. 8, 2015  (JP) ................................. 2015-176965

(51) Int. Cl.
*H04N 1/04*  (2006.01)
*H04N 1/00*  (2006.01)
*H04M 3/02*  (2006.01)

(52) U.S. Cl.
CPC .......... *H04N 1/00891* (2013.01); *H04M 3/02* (2013.01); *H04N 1/00302* (2013.01); *H04N 1/00896* (2013.01)

(58) Field of Classification Search
CPC .......... H04N 1/00891; H04N 1/00896; H04N 1/00302
USPC .................................................... 358/468, 474
See application file for complete search history.

(56) References Cited

U.S. PATENT DOCUMENTS

| 5,315,397 A * | 5/1994 | Inoue ................. H04N 1/32379 347/3 |
| 6,466,327 B2 | 10/2002 | Inaba et al. .................. 258/1.13 |
| 9,628,653 B2 * | 4/2017 | Ishida ................ H04N 1/00891 |
| 2008/0252922 A1 * | 10/2008 | Ikegami ................ H04L 63/083 358/1.15 |

FOREIGN PATENT DOCUMENTS

| JP | 10-247996 | * 9/1998 | ............... H04N 1/00 |
| JP | 2006-080851 | 3/2006 | |

* cited by examiner

*Primary Examiner* — Houshang Safaipour
(74) *Attorney, Agent, or Firm* — Venable LLP

(57) ABSTRACT

There is provided a communication apparatus to which a telephone is connectable. While the telephone is disconnected from a telephone line, the communication apparatus shifts to a power saving mode. If an incoming call is detected in the power saving mode, the communication apparatus is returned from the power saving mode, and then controls to switch connection between the telephone and the telephone line in accordance with preset setting of an operation at the time of an incoming call.

8 Claims, 10 Drawing Sheets

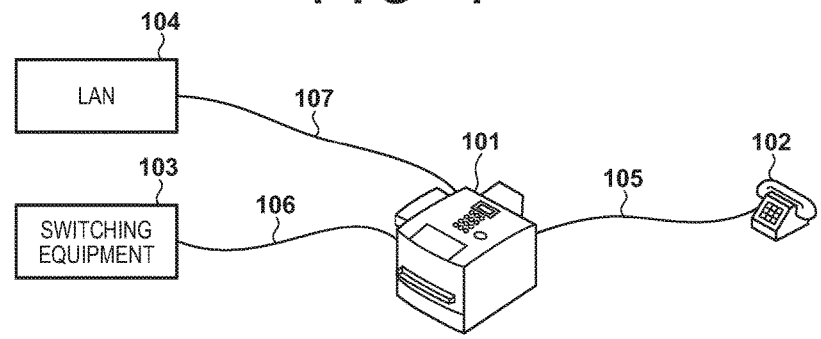
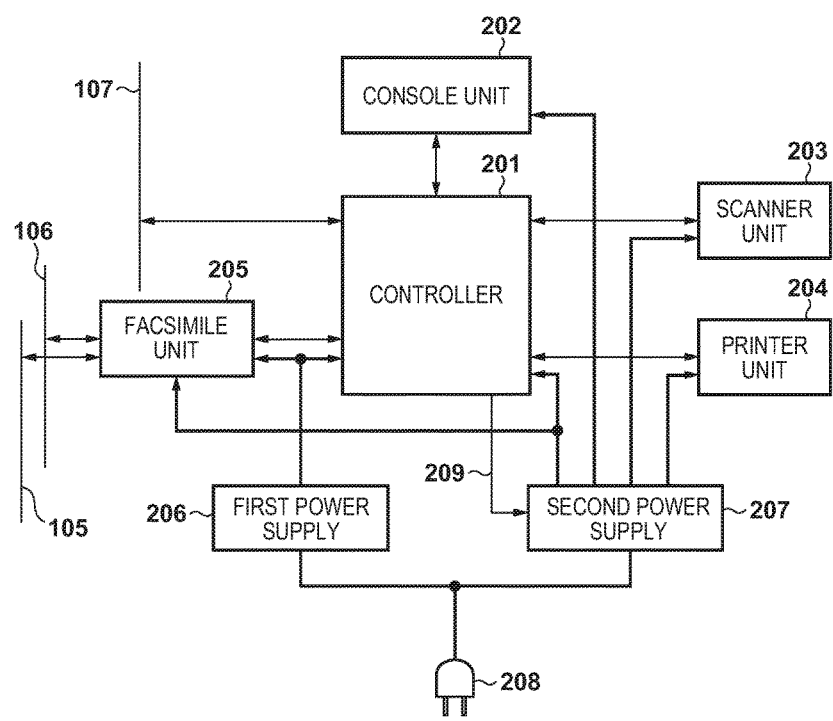

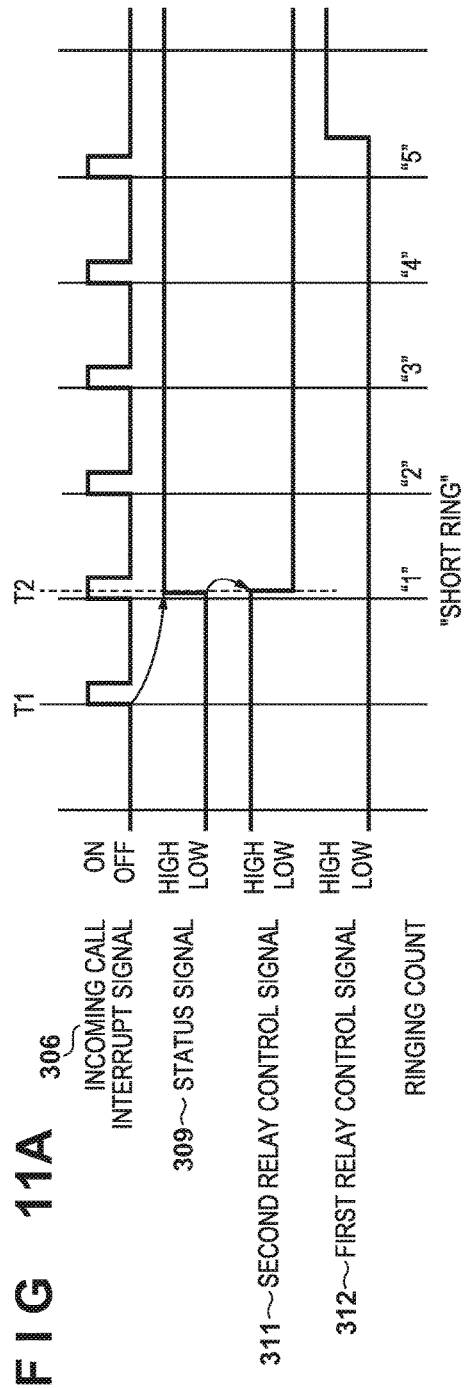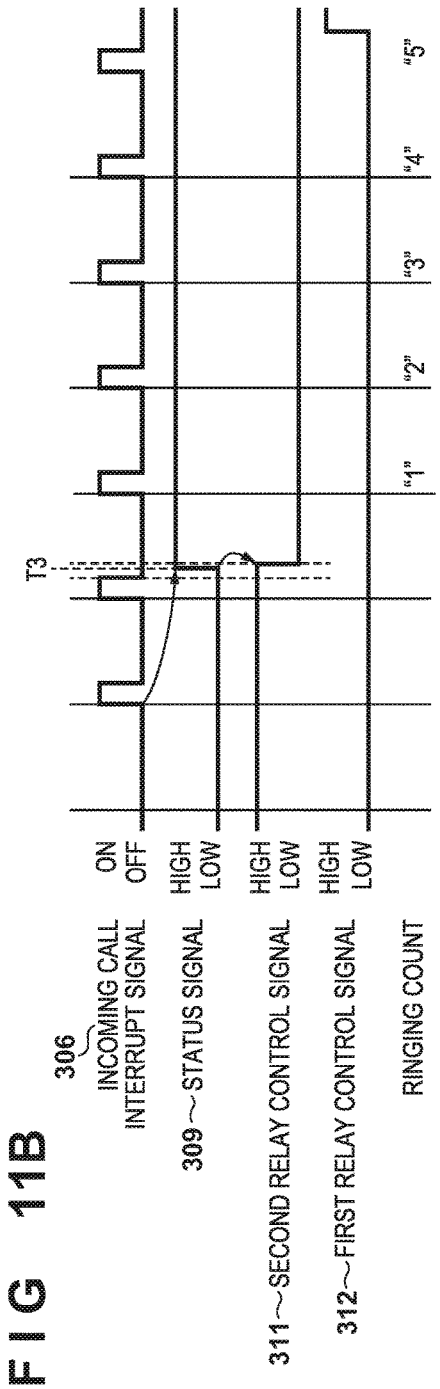

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

In recent years, multi-function peripherals having a facsimile communication function and voice communication function in addition to print and copy functions and the like have become widespread. Conventionally, a telephone can be externally connected to a facsimile apparatus, and the control unit of the facsimile apparatus controls a relay switch circuit to connect or disconnect communication from a telephone line to or from the telephone. In accordance with facsimile reception setting, the control unit controls to connect the telephone to the telephone line if it is necessary to cause the telephone to ring and make the user lift the receiver of the telephone, and to disconnect the telephone from the telephone line otherwise.

On the other hand, the necessity to maintain the low power consumption state (power saving state) as much as possible when the facsimile apparatus is not in use is growing due to an increasing demand for power saving. In this power saving state, power supply to the control unit of the facsimile apparatus is stopped. Thus, if an incoming call ringing signal from the telephone line is detected, the control unit uses the detection as a trigger to return from the power saving state and enter a normal state in which it can respond to the communication circuit. At this time, if the control unit enters the power saving state while keeping the setting of causing the telephone to ring, the telephone unwantedly rings before the control unit of the facsimile apparatus returns to the normal state. Consequently, even if the user immediately off-hooks the receiver of the telephone and performs a desired operation, the control unit may not be able to respond to the operation of the user. To avoid such situation, when an incoming call is received in the power saving state, the telephone is prevented from ringing by disconnecting the telephone from the telephone line. After returning the control unit from the power saving state to the normal state, the telephone is reconnected to the telephone line, the telephone is caused to ring, and the user is prompted to perform a desired operation. This is described in Japanese Patent Laid-Open No. 2006-80851 (D1).

In the technique described in D1, however, since the telephone and the telephone line are connected to each other in the power saving state, preventing the telephone from ringing immediately after an incoming call may be late and the telephone may ring for a moment. In this case, even if the user immediately responds to the ringing for a moment, off-hooks the receiver of the telephone, and performs a desired operation, the control unit cannot respond to the user operation since it has not returned from the power saving state yet.

SUMMARY OF THE INVENTION

An aspect of the present invention is to eliminate the above-mentioned problems with conventional technology.

A feature of the present invention is to provide a technique in which if an incoming call is received in a power saving mode, a telephone is suppressed from ringing, and is caused to ring after returning to a normal operation mode.

According to a first aspect of the present invention, there is provided a communication apparatus being capable of connecting a telephone, the communication apparatus comprising: a setting unit configured to set an operation at the time of an incoming call; a detection unit configured to detect an incoming call; a connection unit configured to perform one of an connection operation and a disconnection operation between the telephone and a telephone line; and a control unit configured to cause the communication apparatus to shift to a power saving mode while the connection unit disconnects the telephone from the telephone line, wherein if the detection unit detects an incoming call in the power saving mode, the control unit returns the communication apparatus from the power saving mode, and then controls to switch connection between the telephone and the telephone line by controlling the connection unit in accordance with the setting by the setting unit.

According to a second aspect of the present invention, there is provided a method of controlling a communication apparatus to which a telephone is connectable, the method comprising: setting an operation at the time of an incoming call; detecting an incoming call; performing one of an connection operation and a disconnection operation between the telephone and a telephone line; and causing the communication apparatus to shift to a power saving mode while the telephone is disconnected from the telephone line in the performing, wherein in the causing, if an incoming call is detected in the detecting in the power saving mode, the communication apparatus is returned from the power saving mode, and then connection between the telephone and the telephone line is switched by controlling the performing in accordance with the setting in the setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view showing an example of the connection arrangement of a multi-function peripheral having the facsimile communication function according to a first embodiment of the present invention;

FIG. 2 is a block diagram for explaining the hardware arrangement of the multi-function peripheral according to the first embodiment;

FIG. 11A is a timing chart for explaining a problem according to the second embodiment;

FIG. 11B is a timing chart for explaining the operation of the multi-function peripheral according to the second embodiment.

DESCRIPTION OF THE EMBODIMENTS

Figure 3:
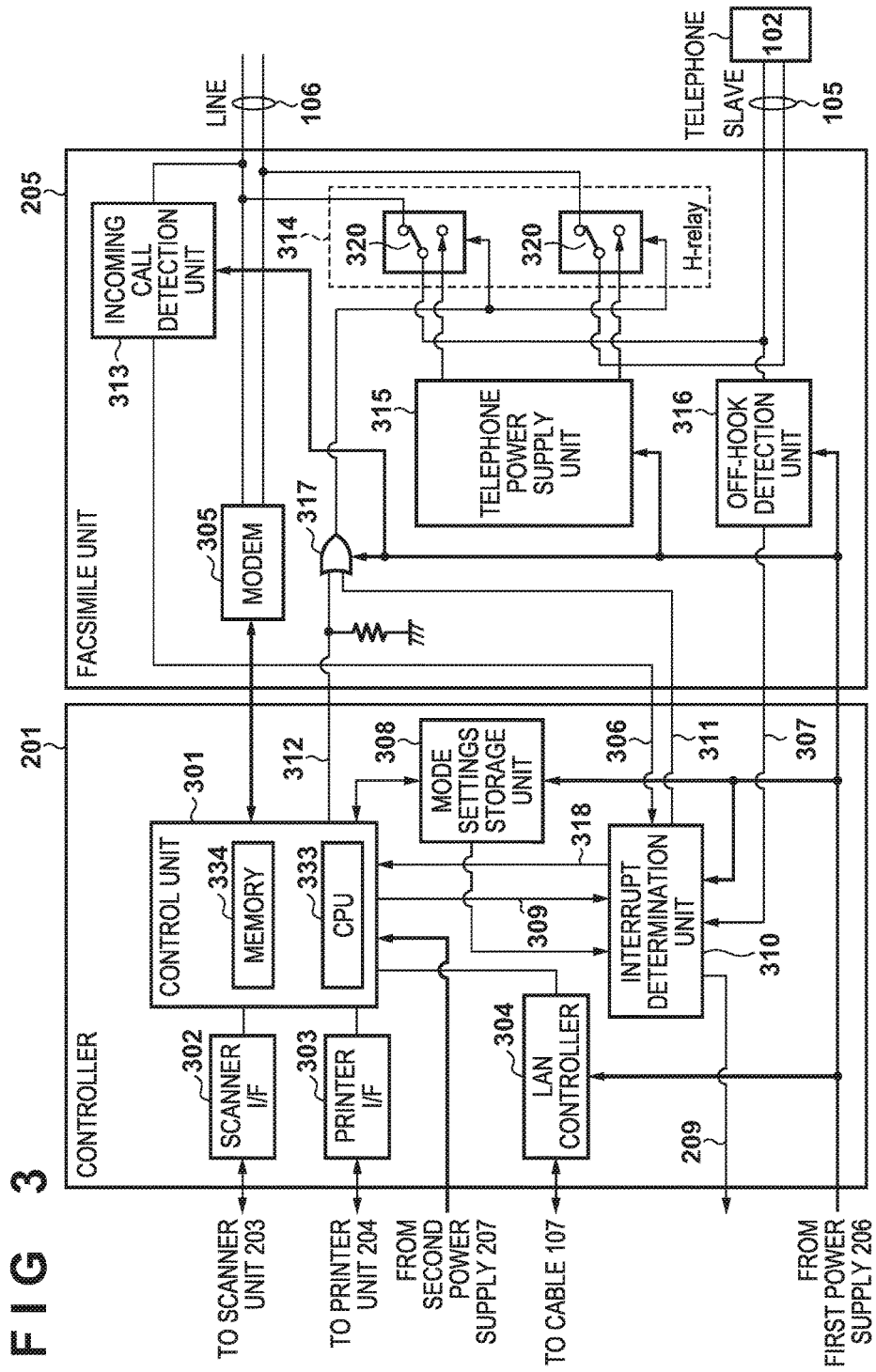
FIG. 3 is a block diagram for explaining the arrangements of the controller and facsimile unit of the multi-function peripheral according to the first embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

FIG. 1 depicts a view showing an example of the connection arrangement of a multi-function peripheral having the facsimile communication function according to the first embodiment of the present invention.

A multi-function peripheral 101 is an MFP (Multi-Function Peripheral) having the facsimile communication function, the copy function, the print function based on a print job transmitted from a network connection destination such as a LAN, and other functions. A telephone 102 is connectable to the multi-function peripheral 101, and the multi-function peripheral 101 is connected to a switching equipment 103 via a telephone line 106, and connected to a public switched telephone network via the switching equipment 103. The telephone 102 is connected to the multi-function peripheral 101 via a telephone line 105, and the multi-function peripheral 101 can perform an operation by switching between the facsimile transmission/reception function and the voice communication function by the telephone. The multi-function peripheral 101 is connected to a network via a cable 107 and a LAN network terminal 104. In this embodiment, the multi-function peripheral (MFP) will be exemplified as a communication apparatus. However, the communication apparatus may be a facsimile apparatus having only the facsimile communication function.

FIG. 2 is a block diagram for explaining the hardware arrangement of the multi-function peripheral 101 according to the first embodiment.

A controller 201 controls the respective units of the multi-function peripheral 101, and performs image processing, transmission/reception of data, data conversion, data saving, power control, and the like by the multi-function peripheral 101. A console unit 202 includes an operation panel used by the user to perform various operations, and a display unit for displaying operation information. A scanner unit 203 scans an image of a document and inputs it to the controller 201. A printer unit 204 receives various kinds of image data processed by the controller 201, and prints images on sheets. A facsimile unit 205 is connected to the switching equipment 103 and telephone 102 shown in FIG. 1 via the telephone line 106 and telephone line 105, respectively.

A first power supply 206 and a second power supply 207 are power supplies for converting commercial AC power supplied from the power plug 208 into a DC voltage to be used in the respective units of the multi-function peripheral 101. In the normal operation mode, power from the first power supply 206 and that from the second power supply 207 are supplied to the respective units of the multi-function peripheral 101. On the other hand, when shifting to the power saving mode in which the power consumption is reduced, the power output of the second power supply 207 is stopped by a power control signal 209 supplied from the controller 201.

If a job transmitted from an external apparatus is received when the multi-function peripheral 101 is in the power saving mode, the controller 201 starts the power output of the second power supply 207 by the power control signal 209 in order to shift from the power saving mode to the normal operation mode.

Note that as shown in FIG. 2, the power from the second power supply 207 is supplied to the controller 201, console unit 202, scanner unit 203, printer unit 204, and facsimile unit 205. The power from the first power supply 206 is supplied to the controller 201 and facsimile unit 205.

FIG. 3 is a block diagram for explaining the arrangements of the controller 201 and facsimile unit 205 of the multi-function peripheral 101 according to the first embodiment.

A control unit 301 of the controller 201 includes a CPU 333 for control and a memory 334, and controls data exchange according to a target unit in accordance with various processing modes such as copy, print, and facsimile modes. The CPU 333 executes programs stored in the memory 334 to perform various control operations (to be described later). Note that the memory 334 collectively indicates a memory nonvolatilely storing programs and a RAM for providing the work memory of the CPU 333. A scanner I/F 302 and a printer I/F 303 are, respectively, interfaces (I/Fs) for connecting the scanner unit 203 and the printer unit 204 to the control unit 301. A LAN controller 304 is connected to the LAN network terminal 104 via the cable 107, and communicates with an external apparatus via the network.

An incoming call interrupt signal 306 is output from an incoming call detection unit 313 of the facsimile unit 205, and is output when the incoming call detection unit 313 receives a facsimile or telephone incoming call via the telephone line 106. An off-hook interrupt signal 307 is output from an off-hook detection unit 316 of the facsimile unit 205. If the off-hook detection unit 316 detects that the receiver of the telephone 102 connected via the telephone line 105 is lifted (off-hooked), the off-hook interrupt signal 307 is set at high level. A mode settings storage unit 308 stores the facsimile reception mode setting of the multi-function peripheral 101. If the user sets the facsimile reception mode via the console unit 202, the control unit 301 stores the set facsimile reception mode in the mode settings storage unit 308. A status signal 309 is output from the control unit 301, and is a signal for sending a notification that the control unit 301 has returned to the normal operation mode in which it can control a modem 305 to perform facsimile transmission/reception. If the status signal 309 is at high level, the control unit 301 is in the normal operation mode. If the status signal 309 is at low level, the control unit 301 is in the power saving mode or is returning from the power saving mode. When the incoming call interrupt signal 306 or the off-hook interrupt signal 307 is input, if the status signal 309 is at low level (power saving mode), an interrupt determination unit 310 outputs the power control signal 209 to turn on the power output of the second power supply 207. Even if the status signal 309 is at low level and setting for using the telephone 102 has been set in the mode settings storage unit 308, an H-relay 314 is controlled by a second H-relay (to be referred to as second relay hereinafter) control signal 311 to disconnect the telephone 102 from the switching equipment 103. An interrupt signal 318 is a signal which is set at high level to notify the control unit 301 of the occurrence of an interrupt when the interrupt determination unit 310 accepts the incoming call interrupt signal 306 or the off-hook interrupt signal 307.

The arrangement of the facsimile unit 205 will be described next.

The H-relay (relay) 314 is a relay switch circuit which can selectively control whether to electrically connect or disconnect the telephone 102 to or from the switching equipment 103. Note that the relay 314 electrically disconnects the telephone 102 from the switching equipment 103 when switches 320 are ON, and connects the telephone 102 and the switching equipment 103 when the switches 320 are OFF. If the telephone 102 is disconnected from the switching equipment 103, no power is supplied to the telephone 102. Thus, even if the receiver of the telephone 102 is off-hooked, no signal can be output to the off-hook detection unit 316. Consequently, while the telephone 102 is electrically disconnected from the switching equipment 103, the off-hook detection unit 316 cannot detect the off-hook of the telephone 102. To cope with this, while the telephone 102 is disconnected from the switching equipment 103, a telephone power supply unit 315 supplies power to the telephone 102 so as to detect the off-hook. On the other hand, while the telephone 102 and the switching equipment 103 are connected by the relay 314, the switching equipment 103 supplies power to the telephone 102. An OR circuit 317 selects whether to control the relay 314 by a control signal 312 from the control unit 301 or the control signal 311 from the interrupt determination unit 310. Note that FIG. 3 shows a state in which the switches 320 are OFF and the telephone 102 and the switching equipment 103 are connected.

The control unit 301 controls the relay 314 by controlling the first H-relay (to be referred to as first relay hereinafter) control signal 312 in the normal operation mode, and controls the relay 314 using the second relay control signal 311 in the power saving mode. The OR circuit 317 is not limited to the circuit in the first embodiment as long as the same operation is performed.

Note that in the first embodiment, the second power supply 207 supplies power to at least the control unit 301. In the power saving mode, the control unit 301 is powered off or only small part of the control unit 301 is supplied with power so as to receive a return trigger.

In the embodiment of the present invention, an operation will be described by exemplifying a case in which "remote reception" setting of facsimile reception setting is made. If the "remote reception" setting is made, when the telephone 102 rings, the user can lift the receiver of the telephone 102 to hear a voice, and continuously perform voice communication if an incoming call is received from the telephone. On the other hand, if an incoming call is received from the facsimile, the user can shift to facsimile reception by performing a preset push operation of the telephone 102.

Figure 4:
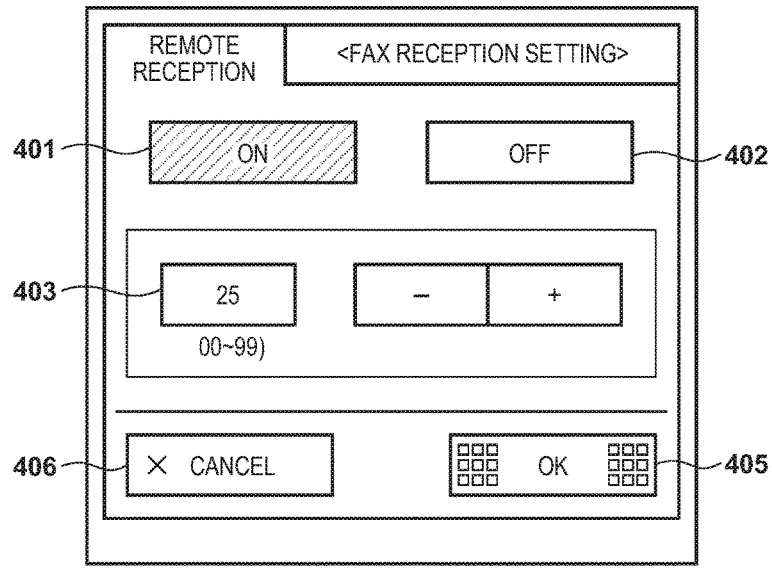
FIG. 4 depicts a view showing an example of a screen for prompting the user to set "remote reception" setting displayed on the display unit of the console unit of the multi-function peripheral according to the first embodiment.

FIG. 4 depicts a view showing an example of a screen for prompting the user to set the "remote reception" setting displayed on the display unit of the console unit 202 of the multi-function peripheral 101 according to the first embodiment.

If "remote reception" is set, the user presses an "ON" button 401 on this screen. If no "remote reception" is set, the user presses an "OFF" button 402. After that, if setting is complete, when the user presses an "OK" button 405, this screen is closed, and items input in the screen are set. On the other hand, if the user wants to cancel the setting on the screen and redo setting, he/she presses a "cancel" button 406. A setting value 403 defines an operation in which when an incoming call is received, the user lifts the receiver of the telephone 102 to cause the multi-function peripheral 101 to start a facsimile reception operation, and designates an operation for dial numbers. This setting value 403 can be increased/decreased when the user presses a "+" or "−" button on the right side of the setting value 403. In the setting example shown in FIG. 4, "25" is set as the setting value 403. In this case, after the user lifts the receiver of the telephone 102, and confirms a facsimile incoming call, he/she can start facsimile reception by sequentially pressing the numeric keys "2" and "5" of the telephone 102.

As in the case in which the "remote reception" setting is ON, in a mode for prioritizing a telephone incoming call to the telephone 102, the multi-function peripheral waits in the normal operation mode while controlling the relay 314 to electrically connect the telephone 102 to the switching equipment 103. A waiting state while the telephone 102 and the switching equipment 103 are electrically connected will be referred to as a "waiting in ringing mode" hereinafter, and a waiting state while the telephone 102 is disconnected from the switching equipment 103 will be referred to as a "waiting in non-ringing mode" hereinafter.

An operation when a facsimile incoming call is received in the normal operation mode (the status signal 309 is at high level) will be described with reference to a timing chart shown in FIG. 12.

Figure 12:
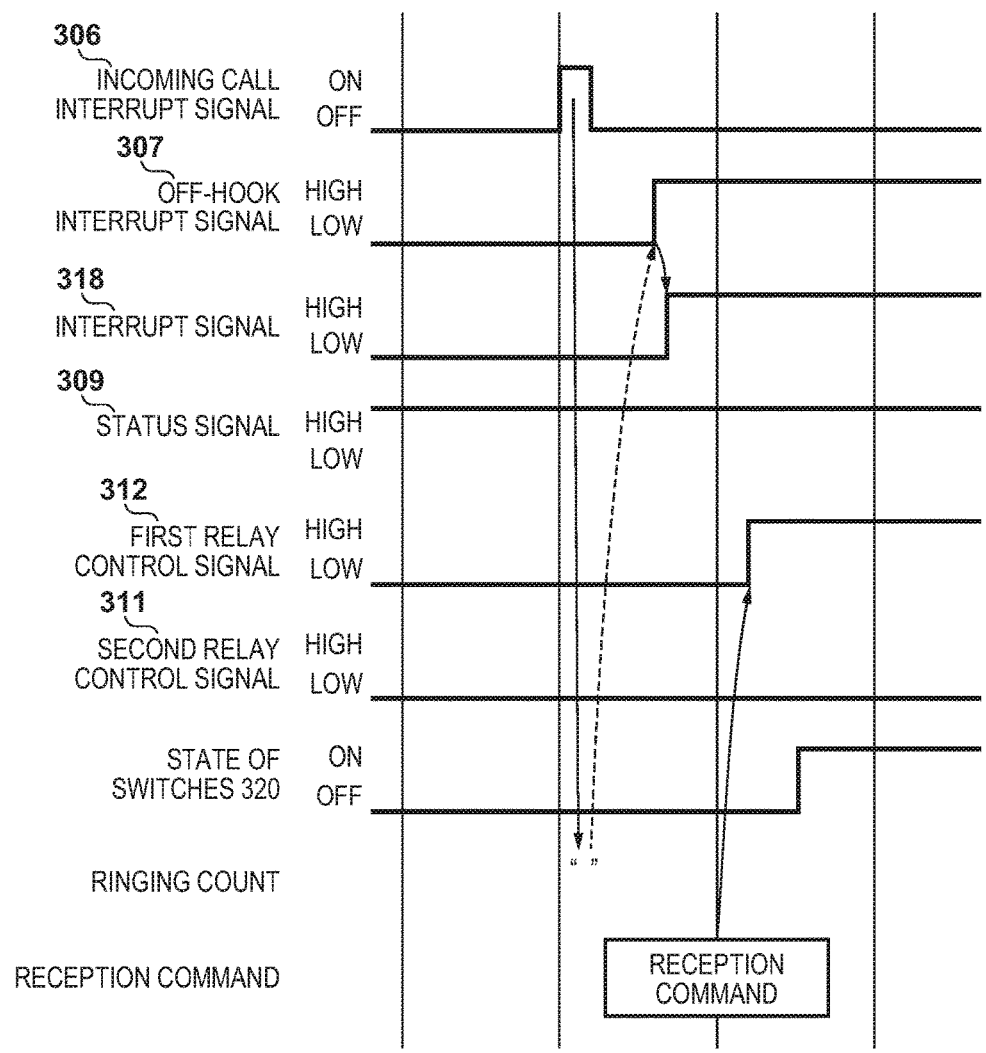
FIG. 12 is a timing chart for explaining an operation when the multi-function peripheral receives a facsimile incoming call in a normal operation mode according to the embodiment.

FIG. 12 is a timing chart for explaining an operation when the multi-function peripheral 101 receives a facsimile incoming call in the normal operation mode according to the embodiment.

In the normal operation mode, the second power supply 207 supplies power to all of the controller 201 and facsimile unit 205.

In this state, if a facsimile incoming call is received, the incoming call interrupt signal 306 is turned on and an incoming call signal is also supplied to the telephone 102. The telephone 102 rings when the incoming call signal is ON. If the user perceives this ringing, and lifts the receiver of the telephone 102, the off-hook interrupt signal 307 is set at high level. If "remote reception" has been set, the interrupt signal 318 is set at high level based on the off-hook interrupt signal 307. If the interrupt signal 318 is set at high level, the control unit 301 waits for a reception command. If the user performs, in the telephone 102, an operation of instructing to start facsimile reception (in the above-described example, an operation of inputting the numerical keys "2" and "5"), which has been set in the screen shown in FIG. 4, the control unit 301 is notified of the reception command. Upon accepting the reception command, the control unit 301 controls the modem 305 to capture the telephone line, and sets the first relay control signal 312 at high level to turn on the switches 320 of the relay 314, thereby electrically disconnecting the telephone 102 from the switching equipment 103. This enables the multi-function peripheral 101 to start facsimile reception.

Figure 5:
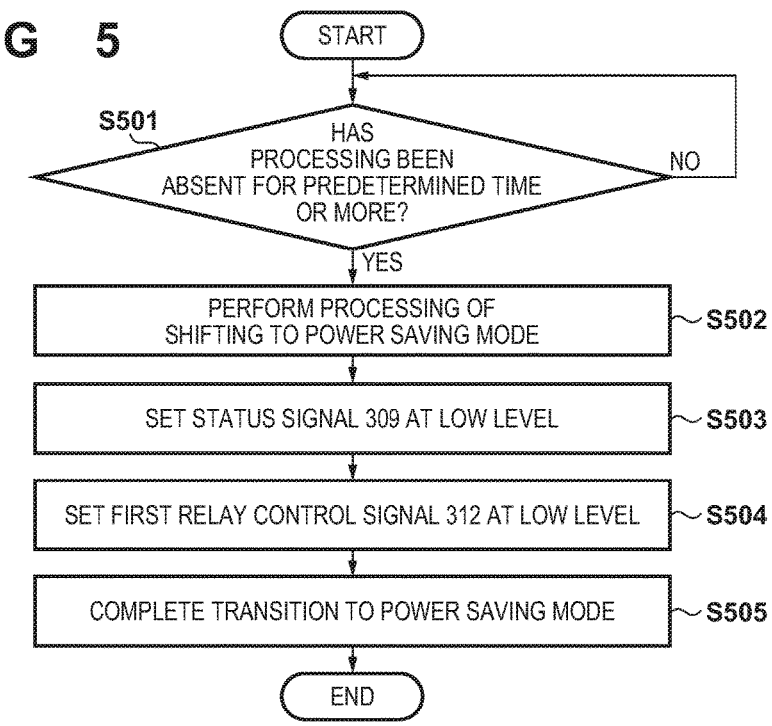
FIG. 5 is a flowchart for describing the processing of a control unit when shifting to a power saving mode if "remote reception" has been set in the multi-function peripheral according to the first embodiment.

FIG. 5 is a flowchart for describing the processing of the control unit 301 when shifting to the power saving mode if "remote reception" has been set in the multi-function peripheral 101 according to the first embodiment. Note that a program for executing this processing is stored in the memory 334. When the CPU 333 executes the program, the processing shown in the flowchart is implemented.

In step S501, the CPU 333 determines whether no processing such as a job or access to the multi-function peripheral 101 has occurred for a predetermined time period or more. If no processing has occurred for the predetermined time period or more, the process advances to step S502, and the CPU 333 performs processing of shifting to the power saving mode for reducing the power consumption. At this time, the CPU 333 saves software and various data in a nonvolatile memory or a memory area backed up even in the power saving mode. Next, the process advances to step S503, and the CPU 333 sets the status signal 309 at low level to notify the interrupt determination unit 310 that the control unit 301 is to shift to the power saving mode. The process advances to step S504, and the CPU 333 sets the first relay control signal 312 at low level so as to control the relay 314 by the second relay control signal 311. Then, the process advances to step S505. In step S505, the CPU 333 completes the shift to the power saving mode, and ends the processing.

Processing by the interrupt determination unit 310 will be described with reference to a flowchart shown in FIG. 6.

Figure 6:
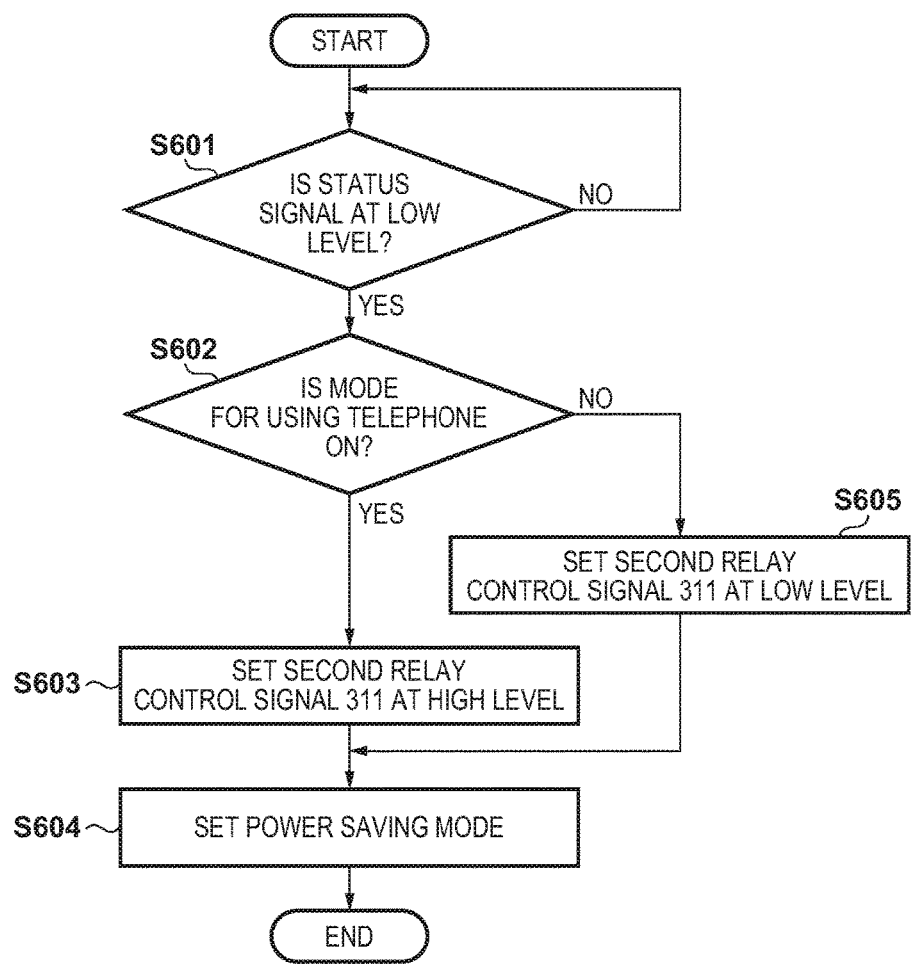
FIG. 6 is a flowchart for describing processing by the interrupt determination unit of the multi-function peripheral according to the first embodiment.

FIG. 6 is a flowchart for describing the processing by the interrupt determination unit 310 of the multi-function peripheral 101 according to the first embodiment.

In step S601, it is determined whether the status signal 309 from the control unit 301 has changed to low level and the control unit 301 has transited to the power saving mode. If the control unit 301 has transited to the power saving mode, the process advances to step S602, and it is determined whether the flag of a mode for using the telephone 102 is ON in the mode settings storage unit 308. At this time, if one of modes for using the telephone 102 is ON, the process advances to step S603. If the modes for using the telephone 102 are not ON, the process advances to step S605. In step S603, the interrupt determination unit 310 sets the second relay control signal 311 at high level to set the "waiting in non-ringing mode" state, and the process advances to step S604. On the other hand, in step S605, the interrupt determination unit 310 sets the second relay control signal 311 at low level to set the "waiting in ringing mode" state, and the process advances to step S604. Note that if "remote reception" has been set, the "waiting in ringing mode" state is set in the normal operation mode. In step S604, the interrupt determination unit 310 turns off the power output of the second power supply 207 by the power control signal 209 to transit to the power saving mode, thereby ending the processing.

As described above, according to the first embodiment, in the power saving mode, even if the mode for using the telephone has been set, the telephone is disconnected from the telephone line. This prevents the telephone from ringing when an incoming call is received in the power saving state.

Processing when the multi-function peripheral 101 receives an incoming call in the power saving mode according to the first embodiment will be described next with reference to flowcharts shown in FIGS. 7 and 8.

Figure 7:
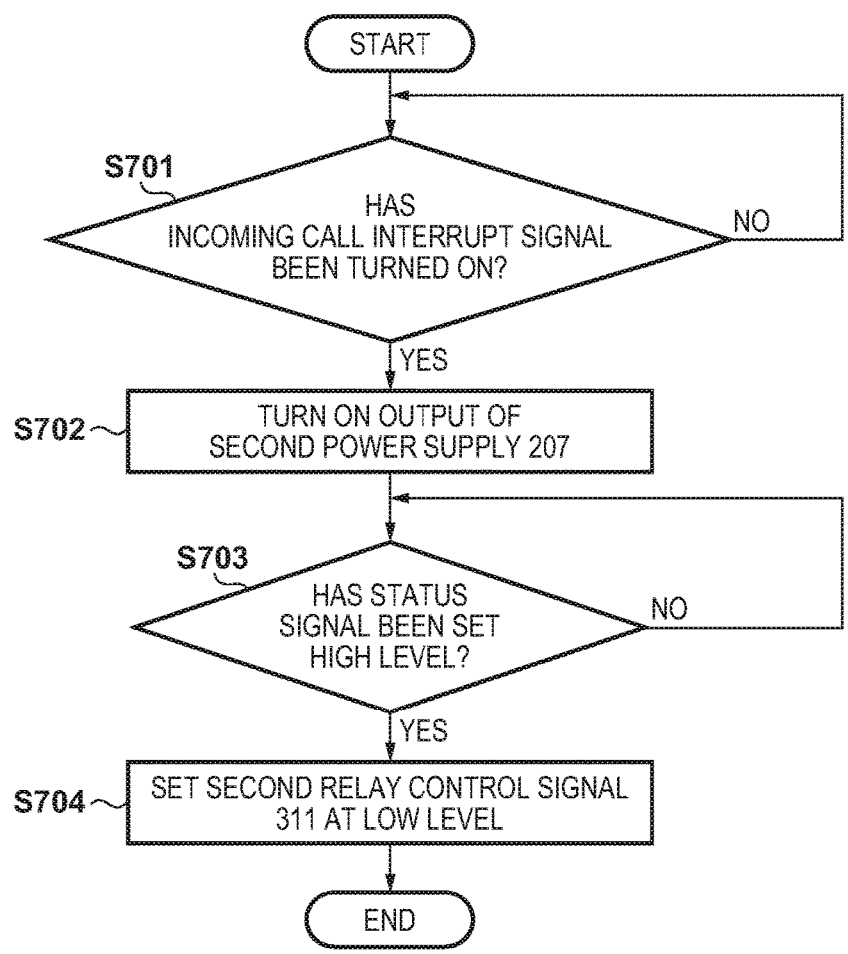
FIG. 7 is a flowchart for describing processing by the interrupt determination unit when the multi-function peripheral receives an incoming call in the power saving mode according to the first embodiment.

FIG. 7 is a flowchart for describing processing by the interrupt determination unit 310 when the multi-function peripheral 101 receives an incoming call in the power saving mode according to the first embodiment.

In step S701, it is determined whether the incoming call interrupt signal 306 output from the incoming call detection unit 313 of the facsimile unit 205 has been turned on. If it is determined that the incoming call interrupt signal 306 has been turned on, the process advances to step S702, and the interrupt determination unit 310 turns on the power output of the second power supply 207 by the power control signal 209 to return the control unit 301 from the power saving mode to the normal operation mode. The process advances to step S703, and the interrupt determination unit 310 waits until the status signal 309 output from the control unit 301 is set at high level. That is, the interrupt determination unit 310 waits until the control unit 301 returns from the power saving mode to the normal operation mode, and then the process advances to step S704. In step S704, the interrupt determination unit 310 sets the second relay control signal 311 at low level so as to control the relay 314 by the first relay control signal 312 from the control unit 301, thereby ending the processing.

Figure 8:
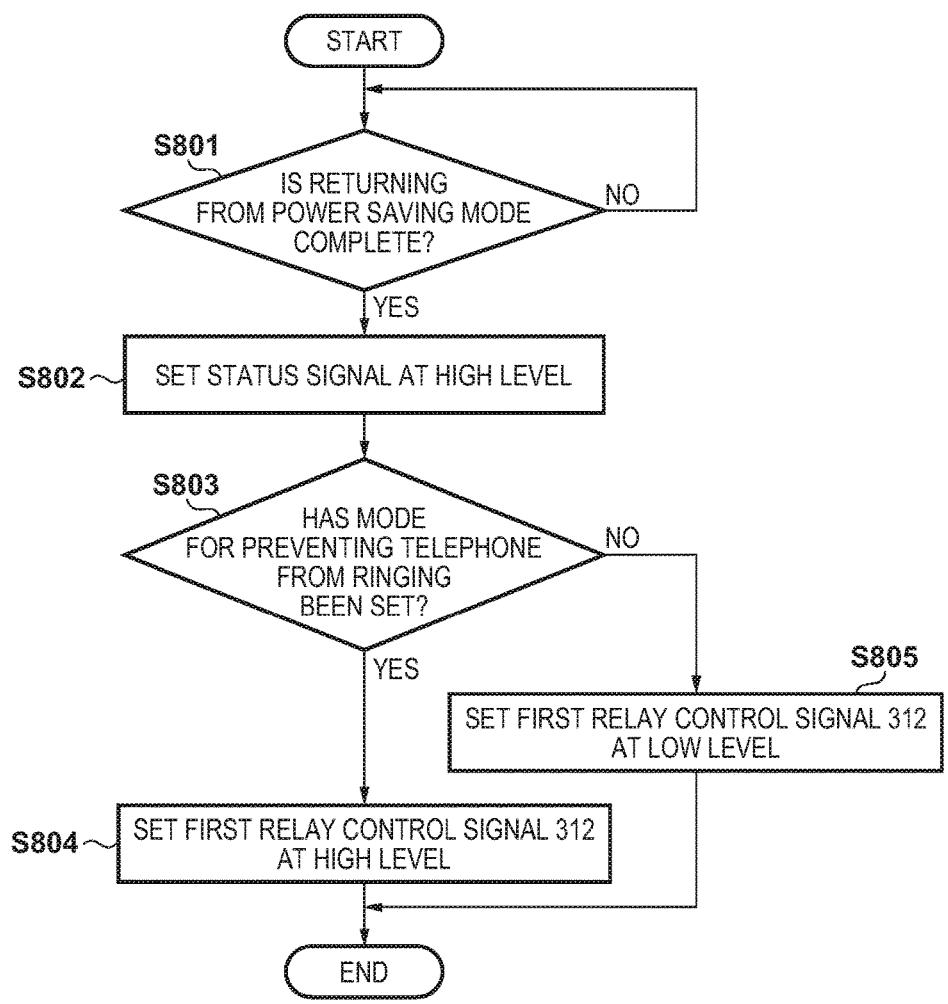
FIG. 8 is a flowchart for describing processing by the control unit when the multi-function peripheral receives an incoming call in the power saving mode according to the first embodiment.

FIG. 8 is a flowchart for describing processing by the control unit 301 when the multi-function peripheral 101 receives an incoming call in the power saving mode according to the first embodiment. Note that a program for executing this processing is stored in the memory 334. When the CPU 333 executes the program, the processing shown in the flowchart is implemented.

If the power output of the second power supply 207 is turned on in step S702 of FIG. 7, power is supplied to the control unit 301. This causes the CPU 333 to determine in step S801 that returning from the power saving mode is complete, and the process advances to step S802. In step S802, the CPU 333 sets the status signal 309 at high level to notify the interrupt determination unit 310 of returning to the normal operation mode. With this processing, in step S703 of FIG. 7 described above, the interrupt determination unit 310 detects that the control unit 301 has returned from the power saving mode to the normal operation mode. The process advances to step S803, and the CPU 333 determines whether the mode stored in the mode settings storage unit 308 indicates that the waiting state at the time of reception has been set to a mode for preventing the telephone 102 from ringing. If it is determined that the mode for preventing the telephone 102 from ringing has been set, the process advances to step S804, and the CPU 333 sets the first relay control signal 312 at high level to control the relay 314 in the "waiting in non-ringing mode" (turn on the switches 320). On the other hand, if it is determined in step S803 that the mode for preventing the telephone 102 from ringing is OFF, the process advances to step S805, and the CPU 333 sets the first relay control signal 312 at low level to control the relay 314 in the "waiting in ringing mode" (turn off the switches 320).

For example, the "remote reception setting" of the facsimile reception setting is the "waiting in ringing mode" in the normal operation mode, and is set to the "waiting in non-ringing mode" if "FAX/TEL automatic switching" setting is ON. Note that "FAX/TEL automatic switching" is a mode in which if the incoming call interrupt signal 306 is detected, the control unit 301 controls the modem 305 to determine whether an incoming call is facsimile or telephone reception and select processing. If the incoming call is facsimile reception, reception of a facsimile signal starts while keeping the relay 314 in the "waiting in non-ringing mode". If the incoming call is a telephone incoming call, the relay 314 is switched to the "waiting in ringing mode" to cause the telephone 102 to ring, thereby notifying the user of the incoming call.

Figure 9:
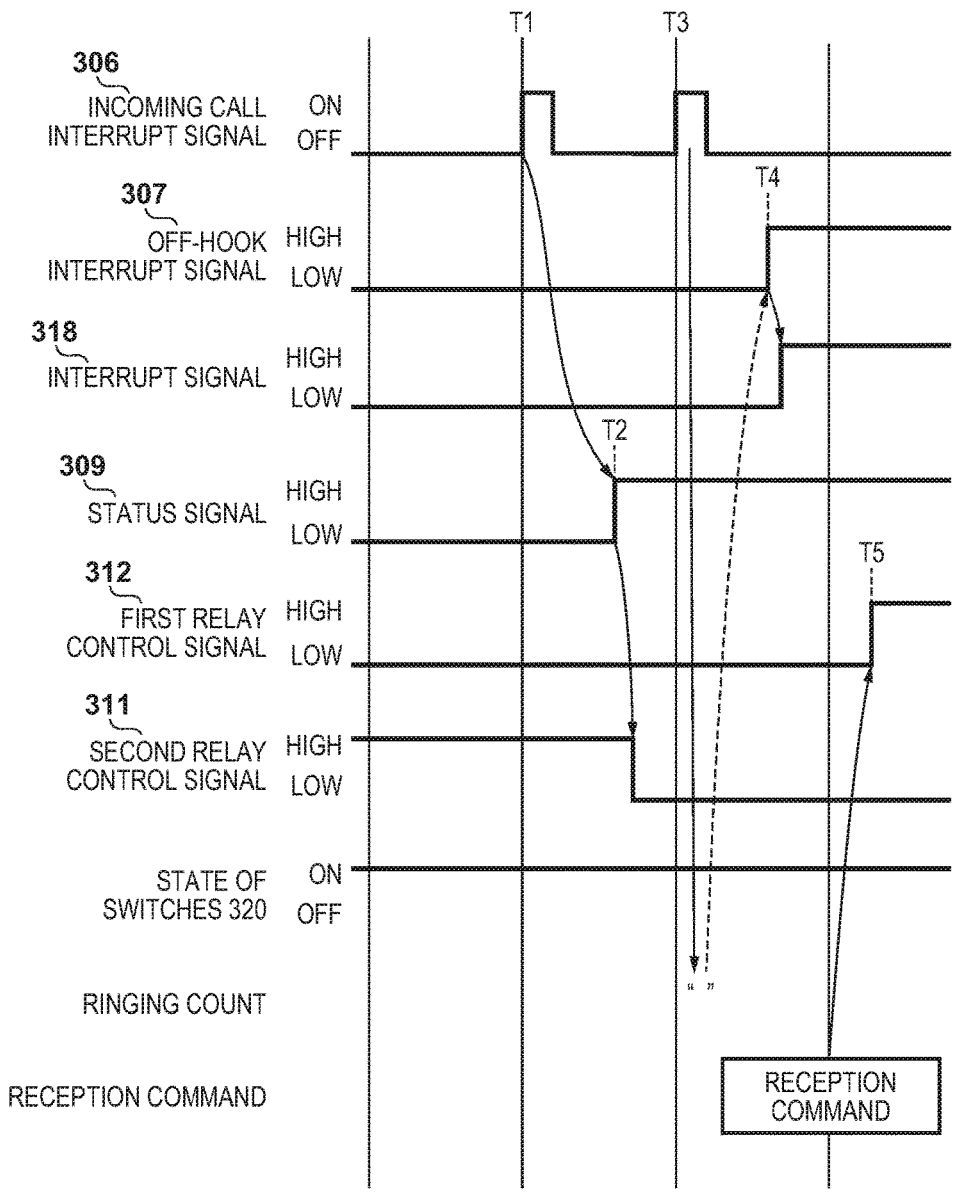
FIG. 9 is a timing chart showing an operation when "remote reception" is set and the multi-function peripheral receives a facsimile incoming call while operating in the power saving mode according to the first embodiment.

FIG. 9 is a timing chart showing an operation when "remote reception" is set and the multi-function peripheral 101 receives a facsimile incoming call while operating in the power saving mode according to the first embodiment.

During the operation in the power saving mode, the power supply from the second power supply 207 is stopped. Therefore, at least the control unit 301 is powered off or is in the power saving mode and thus facsimile control is impossible. Furthermore, the second relay control signal 311 is at high level and the "waiting in non-ringing mode" state is set.

In this state, if the incoming call interrupt signal 306 is turned on at timing T1, the interrupt determination unit 310 controls the power control signal 209 to turn on the power output of the second power supply 207. This supplies power to the control unit 301 and the status signal 309 is set at high level at T2. The interrupt determination unit 310 detects that the control unit 301 has returned from the power saving mode to the normal operation mode, sets the second relay control signal 311 at low level, and connects the telephone 102 and the switching equipment 103, thereby shifting to the normal operation mode. This enables the multi-function peripheral 101 to cause the telephone 102 to ring. At timing T3 when the incoming call interrupt signal 306 is turned on next, the telephone 102 rings to the user for the first time. If the user then off-hooks the receiver of the telephone 102 at T4, the off-hook interrupt signal 307 is set at high level. As described above, in the telephone 102, the user performs an operation of instructing to start facsimile reception (in the above-described example, an operation of inputting the numerical keys "2" and "5"), which has been set in the screen shown in FIG. 4. The control unit 301 is notified of a reception command. Upon accepting the reception command, the control unit 301 controls the modem 305 to capture the telephone line, and sets the first relay control signal 312 at high level to turn on the switches 320 of the relay 314 at T5, thereby electrically disconnecting the telephone 102 from the switching equipment 103. This enables the multi-function peripheral 101 to start facsimile reception.

In the first embodiment, even if the control unit 301 of the facsimile function is in the power saving mode, the interrupt determination unit 310 operable in the power saving mode can control connection between the telephone and telephone line to avoid ringing of the telephone at the time of an incoming call interrupt. After the control unit 301 of the facsimile function surely returns to the normal operation mode during the "waiting in non-ringing mode" in the power saving mode, the control of the relay can be switched to control by the control unit 301.

According to the first embodiment, if a facsimile signal is received in the power saving mode, it is possible to cause the telephone to ring after the control unit returns to the normal operation mode. This can prevent a situation in which if the telephone rings before the control unit returns from the power saving mode, and the user immediately responds to the ringing for a moment and off-hooks the receiver of the telephone to perform an operation, the control unit cannot respond to the operation since it has not returned from the power saving state.

Second Embodiment

The second embodiment will describe "incoming call ringing setting" of facsimile reception mode setting, which is set in the "waiting in ringing mode" state in the normal operation mode. The connection arrangement, internal arrangement, and internal details of a multi-function peripheral 101 are the same as those shown in FIGS. 1 to 3 in the above-described first embodiment and a description thereof will be omitted.

Figure 10:
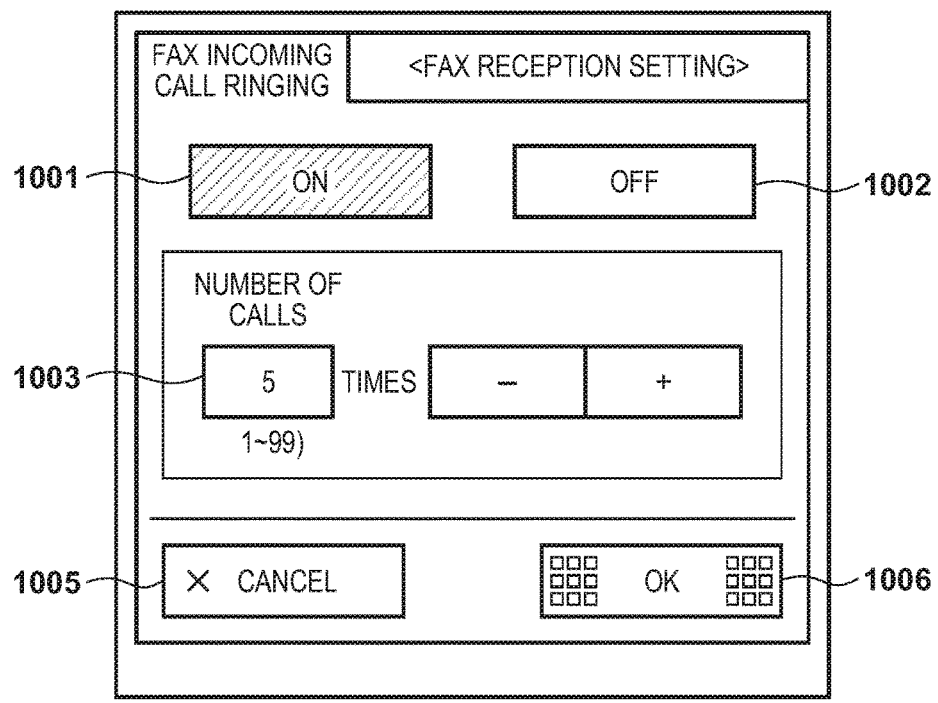
FIG. 10 depicts a view showing an example of a screen for setting "incoming call ringing" setting displayed on the display unit of a console unit of a multi-function peripheral according to a second embodiment of the present invention.

FIG. 10 depicts a view showing an example of a screen for setting "incoming call ringing" setting displayed on the display unit of a console unit 202 of the multi-function peripheral 101 according to the second embodiment of the present invention.

The facsimile incoming call ringing setting is setting for causing, when an incoming call is received from a public switched telephone network via a switching equipment 103, a telephone 102 to ring to notify the user of the incoming call. If the incoming call ringing setting is set, the user presses an "ON" button 1001. If no incoming call ringing setting is set, the user presses an "OFF" button 1002. If the setting is OK, the user presses an "OK" button 1006. If the user redoes the setting, he/she presses a "cancel" button 1005. A number 1003 of calls is a value for determining in advance the number of calls before the receiver of the telephone 102 is lifted at the time of an incoming call. The number 1003 of calls can be increased/decreased using a "+" or "−" button. In the setting example of the second embodiment, 5 is set. If the receiver is not lifted before the telephone rings five times at the time of an incoming call, the mode is automatically switched to the facsimile reception mode to perform an operation.

However, the control unit (a control unit 301 in the second embodiment) of the facsimile function counts the ringing count, and the control unit 301 cannot execute control in the power saving mode. Therefore, before the power supply returns at the time of an incoming call to be able to control a modem 305, the ringing count cannot be accurately counted, ringing immediately after the incoming call is missed, and thus the telephone may ring the number of times larger than the setting value.

In the above-described first embodiment, after the control unit 301 returns, the status signal 309 is set at high level to notify the interrupt determination unit 310 that the control unit 301 has returned, and then the second relay control signal 311 is set at low level to perform connection to the ringing side. Consequently, the first ringing state may sound unnatural to the user.

FIG. 11A is a timing chart for explaining the above-described state.

Referring to FIG. 11A, if an incoming call detection unit 313 detects the first incoming call at T1, an incoming call interrupt signal 306 is turned on, and the interrupt determination unit 310 turns on the power output of a second power supply 207 to set a status signal 309 from the control unit 301 at high level (T2). An interrupt determination unit 310 sets a second relay control signal 311 at low level. This turns off switches 320 of a relay 314 to connect the telephone line and the telephone 102. Thus, the first ringing at T2 sounds shorter than normal ringing.

To cope with this, as shown in FIG. 11B, after returning to the normal operation mode by the incoming call interrupt signal 306, the control unit 301 controls the modem 305, waits until timing T3 at which the incoming signal is turned off (the non-ringing state is set), and then sets the status signal 309 at high level. The interrupt determination unit 310 sets the second relay control signal 311 at low level.

As described above, according to the second embodiment, as shown in FIG. 11B, after returning by the incoming call interrupt signal 306, the control unit 301 waits until a timing at which the incoming call interrupt signal 306 is turned off (the non-ringing state is set), and then turns on the status signal 309 to send a notification that the control unit has shifted to the normal operation mode. This prevents the interrupt determination unit 310 from connecting the telephone line and the telephone 102 while a signal for causing the telephone to ring is output. Thus, ringing for a moment, as shown in FIG. 11A, can be prevented. With this processing, the first ringing of the telephone 102 can sound natural to the user.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-176965, filed Sep. 8, 2015, which is hereby incorporated by reference herein in its entirety.

What is claimed is:

1. A communication apparatus capable of connecting a telephone to a telephone line and capable of shifting to a power saving state, the communication apparatus comprising:

a controller configured to switch between a first state in which the telephone is connected to the telephone line and a second state in which the telephone is disconnected from the telephone line, wherein the controller switches from the first state to the second state and the communication apparatus shifts to the power saving state in a case that a condition that the communication apparatus shifts to the power saving state is satisfied, and wherein, if the controller detects an incoming call while the communication apparatus is in the power saving state, the communication apparatus returns from the power saving state, and then the controller switches from the second state to the first state.

2. The communication apparatus according to claim 1, further comprising a storage configured to store information indicating a mode of the communication apparatus, wherein, in a case that information indicating a mode in which the telephone rings in accordance with an incoming call is stored in the storage, the controller switches from the first state to the second state when the communication apparatus shifts to the power saving state, and in a case that the information indicating the mode in which the telephone rings in accordance with the incoming call is not stored in the storage, the controller does not switch from the first state to the second state when the communication apparatus shifts to the power saving state.

3. The communication apparatus according to claim 1, wherein the communication apparatus returns from the power saving state in accordance with the controller having detected the incoming call while the communication apparatus is in the power saving state, and the controller switches from the second state to the first state in accordance with having returned the communication apparatus from the power saving state.

4. The communication apparatus according to claim 1, further comprising a user interface configured to accept a setting of an operation on the telephone, by a user, for causing the communication apparatus to start receiving of a facsimile signal, wherein the user off-hooks a receiver of the telephone in accordance with ringing of the telephone.

5. The communication apparatus according to claim 1, further comprising a user interface configured to accept a setting of a number of times for ringing of the telephone until the communication apparatus shifts to a facsimile reception mode.

6. The communication apparatus according to claim 1, further comprising a power supply unit configured to supply electric power to the telephone in a case that the controller switches from the first state to the second state.

7. A method of controlling a communication apparatus capable of connecting a telephone to a telephone line and capable of shifting to a power saving state, the method comprising:

switching from a first state in which the telephone is connected to the telephone line to a second state in which the telephone is disconnected from the telephone line and the communication apparatus shifts to the power saving state, in a case that a condition that the communication apparatus shifts to the power saving state is satisfied; and in a case that an incoming call is detected while the communication apparatus is in the power saving state, returning the communication apparatus from the power saving state and switching from the second state to the first state.

8. A non-transitory computer-readable storage medium storing a program for casing a processor to execute a method of controlling a communication apparatus capable of connecting a telephone to a telephone line and capable of shifting to a power saving state, the method comprising:
    switching from a first state in which the telephone is connected to the telephone line to a second state in which the telephone is disconnected from the telephone line and the communication apparatus shifts to the power saving state, in a case that a condition that the communication apparatus shifts to the power saving state is satisfied; and
    in a case that an incoming call is detected while the communication apparatus is in the power saving state, returning the communication apparatus from the power saving state and switching from the second state to the first state.

* * * * *